United States Patent Office 2,788,369
Patented Apr. 9, 1957

2,788,369

GLUTAMIC ACID PRODUCTION

Henry C. Rosenberg, Toronto, Ontario, Canada, assignor to Dearborn Chemical Company, Chicago, Ill., a corporation of Illinois No Drawing. Application August 20, 1953,
Serial No. 375,549

3 Claims. (Cl. 260—529)

The present invention relates to the preparation of glutamic acid and monosodium glutamate. More particularly, it relates to the preparation of salt-free glutamic acid by means of a novel selective precipitation of glutamic acid from an aqueous salt solution.

In the art of manufacturing glutamic acid, from which monosodium glutamate is normally prepared, it is known that the acid may be isolated from either an alkaline or acid hydrolysate of suitable protein raw materials, such as vegetable or animal proteins or degradation products thereof, such as peptones, pyrrolidone carboxylic acid, or the like. Hitherto, methods for recovering salt-free glutamic acid from such protein hydrolystates have been extremely cumbersome and time consuming. Essentially, the main difficulties encountered in these methods have been the elimination of inorganic salt impurities in the recovery of glutamic acid, and the exceedingly long processing periods required. Indeed, in prior methods, the preparation of salt-free glutamic acid was a difficult and time-consuming task.

I have found that it is now possible to prepare salt-free glutamic acid in as little as 24 hours or less by means of a selective precipitation of the acid from an aqueous protein hydrolysate solution by utilizing organic liquids as precipitants for the acid. Among others, I have discovered that isopropyl alcohol is capable of selectively precipitating glutamic acid from an acidified aqueous salt solution without the coprecipitation of mineral salts.

Accordingly, this invention has as an object the preparation of a high quality, salt-free glutamic acid.

Another object is the preparation of salt-free glutamic acid by precipitation of said acid from aqueous solution by the addition thereto of an organic liquid that has the effect of lowering the solubility of the glutamic acid without, however, precipitating inorganic salts that may be present.

Still another object is a method for the rapid preparation of salt-free glutamic acid.

A further object is the preparation of a high quality monosodium glutamate from the salt-free glutamic acid obained by the method of the present invention.

Other objects and advantages of the present invention will be apparent to those skilled in the art from the following disclosure.

As starting materials in the present invention, almost any proteinaceous glutamic acid-containing substance may be used. The instant method is especially applicable to such by-products as distillery slops, or "stillage," wheat gluten, casin and others. Distillery slops, or "stillage," contain, among other substances, the protein of the grains corn and rye and are obtained as a waste material from the spirits industry. Wheat gluten is the protein fraction of wheat, while casein is obtained from milk. In the present embodiment, the method of practicing the instant invention will be described in its application to distillery slops, or "stillage." However, it is to be understood that my invention is not to be limited thereby.

Distillery slops, or "stillage" as they are commonly called, are obtained from the distilling of corn, rye and similar cereal grains. Commercially, stillage is produced as a slurry-like substance containing protein materials in solid, colloidal and dissolved forms, plus other substances from grain. The various compounds present in stillage are proteins, sugars, such as pentosans, dextrins, and so on, and inorganic salts. The inorganic salts are present in amounts up to 0.5% by weight of the original slops. The salt concentration of stillage, however, is significantly increased when said stillage is hydrolyzed to release the glutamic acid contained therein. In the conventional hydrolysis procedures, hydrochloric acid is used as the hydrolyzing agent and an alkali metal or alkaline earth metal hydroxide, oxide or carbonate, as for instance, sodium hydroxide, is employed as a neutralizing base. Accordingly, such treatment introduces increased amounts of dissolved salts, especially sodium chloride, or the like, into the glutamic acid-containing hydrolysate solution. Another source of salt contaminants is the protein itself that is being hydrolyzed. Under the hydrolysis conditions, ammonia is liberated from the proteins and such ammonia reacts with hydrochloric acid to form ammonium chloride. Thus, it can be seen why prior methods of producing glutamic acid were hindered by salt contamination, and necessitated additional time-consuming purification steps.

The glutamic acid present in stillage or the like may be released by hydrolysis of the source material in the state of dilution in which it is obtained from the supplier. In commercial practice, however, in order to reduce the volume of reagents used in processing, especially hydrochloric acid, the crude starting material is usually concentrated to reduce its volume before hydrolysis. In the present invention, this may be accomplished by several methods; namely, by coagulating or precipitating the protein present in the starting material, or by driving off water from the starting material, as by evaporation or the like.

A coagulation or precipitation of the proteins present in stillage may be easily and economically effected by means of lignosulfonic acids, or a lignosulfonate in an acid medium. For economic reasons, I prefer to employ a salt such as calcium lignosulfonate. Accordingly, the slurry-like stillage is adjusted to a pH of from about 2.0 to 2.5 and a sufficient amount of calcium lignosulfonate is added to the solution, resulting in a coagulation or precipitation of the protein substances present in the mixture. Alternatively, the stillage may be reduced in volume by evaporation or similar methods, preferably to dryness.

The next step in preparing salt-free glutamic acid is that of converting as much as possible of the protein material into glutamic acid. This is conventionally and most efficiently effected by hydrolysis. In the present invention, the hydrolysis step is preferably carried out in an acid medium. The coagulated, concentrated or dried protein materials obtained from the prior step are first introduced into a hydrolyzing vessel. The materials are then acidified by the addition of hydrochloric acid, as for instance, by the addition of sufficient acid of proper concentration to give two parts by weight of 28% to 30% hydrochloric acid to one part of slops calculated on a dry weight basis. The hydrolysis is carried out at an elevated temperature and under a pressure of from about 30 to 35 p. s. i. g. for several hours.

After hydrolysis has been carried to completion, or substantially so, the insoluble materials are separated from the acid hydrolysate solution with or without intermediate cooling of said solution. This separation may be effected by any of the conventional methods, such as filtration, screening, centrifugation, or a combination thereof. The separated insolubles may be re-worked or discarded.

For obvious economic reasons, especially on large scale production, it is expedient to recover as much of the hydrolyzing agent as is possible, in this case, hydrochloric acid. Accordingly, the acid hydrolysate solution containing glutamic acid besides other materials is concentrated in vacuo to remove as much hydrochloric acid as possible. This concentration is easily effected by subjecting the hydrolysate solution to a vacuum of from about 1 to 2 inches of mercury absolute at a temperature not higher than 60° C., until the maximum amount of hydrochloric acid is removed. The acid, thus recovered, is recycled in subsequent hydrolysis operations.

The acidified protein hydrolysate solution, which contains dissolved mineral salts in addition to glutamic acid, is freed of undesirable amino acids by an isoelectric precipitation procedure. It is common knowledge that substantially all of the amino acids present in stillage, wheat gluten, and the like, except for glutamic acid and aspartic acid, have isoelectric points greater numerically than a pH of 6. Accordingly, in this step, the hydrolysate solution is adjusted to a pH of from about 6.0 to 6.4 by the addition of a base, e. g., sodium carbonate, sodium hydroxide, or the like. Sodium carbonate is preferred, because of its buffering action in the pH range of 6.0 to 6.5. The resulting precipitate, which contains substantially all of the non-glutamic acid amino acids, is removed by conventional methods, such as centrifugation, filtration, or the like. The supernatant liquor contains, primarily, dissolved mineral salts, glutamic acid and traces of aspartic acid, the last two being present predominantly as their monosodium salts.

The glutamic acid is next selectively precipitated as a salt-free, free acid from the aqueous protein hydrolysate salt solution. As mentioned above, all previous attempts at selectively precipitating glutamic acid from a salt solution were unsuccessful due to a coprecipitation of mineral salts by the precipitants employed. I have found that glutamic acid can now be precipitated as a salt-free entity from a salt solution containing dissolved mineral salts in the following manner:

The protein hydrolysate solution which has been previously freed of non-glutamic acid amino acids by an isoelectric precipitation at a pH 6.0 to 6.4, is adjusted to a pH of from about 3.0 to 3.2, (glutamic acid's isoelectric point), by the addition of an acid; preferably hydrochloric acid. To the acidified solution is then added a sufficient weight of an organic liquid or of a mixture of organic liquids that have a selective precipitative action toward glutamic acid, to give a 70% by weight or higher concentration of such added organic liquid in the resulting mass. The organic liquids best suited for this purpose are isopropanol; n-propanol; diacetone alcohol; and a 1:1 mixture by volume of isopropanol and acetone; with isopropanol being preferred.

I have found that the addition of three parts by weight or more of isopropanol to one part of a glutamic acid-containing aqueous salt solution at a pH of 3.0 to 3.2 will precipitate substantially all of the glutamic acid present in such solution within a 24-hour period with no coprecipitation of mineral salts. Isopropanol has two other distinct advantages. First, it is low in price and readily available, and second, it may be recovered from solution and re-used in subsequent precipitations.

When isopropanol is added to an aqueous salt solution containing glutamic acid dissolved therein, one solid phase and two liquid phases result. The solid phase is glutamic acid, which precipitates from the solution as a substantially salt-free substance. The lower liquid phase comprises an aqueous salt solution composed primarily of alkaline metal chlorides and undesirable hydrolysate products. The upper liquid phase comprises isopropanol and dissolved salts. Thus, it merely requires the application of simple, gravity separatory techniques to recover the isopropanol layer, which may be easily washed and clarified and re-used in the process.

The precipitated glutamic acid thus obtained is separated from the system and washed with small amounts of isopropanol, or the like. This glutamic acid is substantially salt-free as determined by qualitative determinations. Further, the glutamic acid obtained by the present invention is over 95% pure; the remaining 5% consisting primarily of carbohydrates, other amino acids and traces of salt.

The following specific examples are given by way of illustration only, and are not intended to limit the scope of the novel concepts of the present invention:

*Example 1.*—Casein was hydrolyzed with 26% hydrochloric acid, using 5 parts by weight of acid to one part of dry starting material. This mixture was boiled under gentle reflux for about 34 hours, or until hydrolysis was completed. The hydrolysate mixture was freed of excess hydrochloric acid by evaporation. Contaminant amino acids were removed from the concentrated hydrolysate by precipitation at a pH of from 6.0 to 6.4 by the addition of sodium carbonate; and the precipitate was removed by filtration.

The hydrolysate solution was then adjusted to a pH of 3.1, and was divided into two equal parts. One part was mixed with isopropyl alcohol at a ratio of three parts by weight of alcohol to one part of hydrolysate. After 24 hours, the glutamic acid which crystallized out was removed by filtration, recrystallized and 8.331 grams of glutamic acid crystals were recovered. 0.4 gram of glutamic acid remained in the mother liquor, indicating a relative recovery of 95% of the glutamic acid. The second part was allowed to stand for 7 days with no treatment. At the end of this time, only 5.1 grams of glutamic acid were obtained. After removal of the glutamic acid from the second part, isopropyl alcohol was added to the mother liquor and after 24 hours, 3.15 grams of additional glutamic acid were recovered.

*Example 2.*—A protein hydrolysate derived from wheat gluten by hydrolysis, and treated in the same manner as stated in Example 1 to remove excess acid and contaminant amino acids, was adjusted to a pH of 3.2 and divided into two equal parts. One part was mixed with three parts by weight of isopropyl alcohol. After 24 hours, the glutamic acid which was formed was removed by filtration, and recrystallized; 16.0 grams of glutamic acid were recovered. 1.22 grams of glutamic acid remained in the mother liquor, indicating a relative recovery of 93% of the glutamic acid. The second portion was allowed to stand for 2 days without the addition of the precipitant. After standing for 2 days, only 9.3 grams of glutamic acid were obtained. After five days, 1.2 grams of glutamic acid more were recovered, bringing the total crop to 10.5 grams. The glutamic acid recovered in both instances was found, by qualitative analysis, to be substantially salt-free.

*Example 3.*—Five liters of distillery whole slops were adjusted to a pH of 2.3 and 8.4 grams of calcium lignosulfonate were added in the form of a 40% water solution. After three hours, the flocculated solids were separated by filtration and hydrolyzed by boiling with hydrochloric acid under reflux. Any unreacted fibre was removed by filtration and washed with hot water until the filtrate contained about 10 parts per million of amino nitrogen. The combined filtrates were concentrated under reduced pressure at a temperature of 55° to 60° C. to a syrup-like consistency, removing at the same time, most of the hydrochloric acid. The concentrate was neutralized with 50% sodium hydroxide solution to a pH of 6.1, heated to 60° C. and allowed to stand overnight. The crystalline precipitate which formed was filtered off, and the filtrate adjusted with concentrated hydrochloric acid to a pH of 3.2 and mixed with three times its weight of isopropyl alcohol. After 24 hours, the precipitated raw glutamic acid was removed by filtration, washed with cold water and recrystallized from water in the presence of decolorizing carbon. The snow white glutamic acid which was obtained, was converted into 25.3 grams of monosodium glutamate by dissolving glutamic acid in water and reacting same with a stoichiometric amount of sodium carbonate. 1.49 grams of glutamic acid remained in the mother liquor, indicating a relative recovery of 94% of the glutamic acid. Accordingly, not only does the present invention produce highly purified, salt-free glutamic acid for the preparation of monosodium glutamate, but also the time consumed in the preparation is substantially reduced; namely, from approximately 7 days as now required by conventional methods, to about 24 hours or less.

By way of illustration, and in contrast to the above disclosed examples wherein isopropyl alcohol was used as the organic precipitant, the following example and table show the results of using other organic precipitants in the present invention:

*Example 4.*—A synthetic aqueous solution containing 10.0 grams of sodium chloride, 2.0 grams of ammonium chloride and 1.42 grams of d-glutamic acid per 100 grams was adjusted to a pH of 3.2 by the addition of hydrochloric acid. To separate 100 gram portions of said solution, 300 grams of normal propyl alcohol, of isopropyl alcohol, of diacetone alcohol, and a 1:1 mixture of isopropanol and acetone were added, respectively. Each batch was then thoroughly mixed, and maintained at 25° C. for 24 hours. After this period, the precipitated glutamic acid in each batch was separated by filtration, and the amounts of glutamic acid remaining in the filtrate, i. e. glutamic acid which had not been removed by the alcohol, were determined.

The results were as follows:

| Organic Precipitant Employed | Grams of Glutamic Acid Remaining in Solution |
| --- | --- |
| Normal propyl alcohol | 0.734 |
| Isopropyl alcohol | 0.088 |
| Diacetone alcohol | 0.655 |
| 1:1 mixture of isopropanol and acetone | 0.632 |

From the results of this experiment, it may be seen that isopropyl alcohol is the preferred organic precipitant for use in the present invention. However, as shown above, normal propyl alcohol, diacetone alcohol, and a mixture of isopropanol and acetone can also be satisfactorily employed.

Since workers in the art do not agree as to the accuracy of methods for determining the content of glutamic acid in crude materials, the foregoing Examples 1 through 4 have been given on the basis of the relative recovery of glutamic acid; that is, the amount of glutamic acid precipitated as compared to the amount remaining in the hydrolysate mother liquor.

The salt-free glutamic acid obtained by the present method may be easily converted to monosodium glutamate by any of several conventional methods. For example, the salt-free glutamic acid may be dissolved in water and a stoichiometric amount of sodium base added, such as sodium carbonate, sodium bicarbonate, or sodium hydroxide. The resulting high grade monosodium glutamate may then be separated from the solution by evaporation or similar methods.

It is now possible to prepare salt-free glutamic acid of a high degree of purity in a relatively short period of time by means of the novel selective organic solvent precipitations disclosed herein. Accordingly, it will be understood that various modifications and variations may be effected without departing from the scope of the novel concepts of the present invention.

I claim as my invention:

1. A method for the recovery of glutamic acid of about 95% purity and over from a protein hydrolysate concentrate consisting essentially of glutamic acid and contaminant inorganic salts, which comprises acidifying said concentrate to a pH of about 3.0 to 3.2, adding to the resulting acidified concentrate a sufficient amount of an organic liquid having selective precipitative properties toward glutamic acid to effect the selective precipitation thereof while leaving the contaminant salts in solution, and recovering said precipitated glutamic acid, said organic liquid being selected from the group consisting of isopropanol, n-propanol, diacetone alcohol and a 1:1 mixture by volume of isopropanol and acetone.

2. The method of claim 1 in which a sufficient amount of said organic liquid is added to give at least a 70% by weight concentration of said organic liquid in the resulting mass.

3. The method of claim 2 in which the organic liquid is isopropanol.

References Cited in the file of this patent

UNITED STATES PATENTS

| | | |
| --- | --- | --- |
| 2,222,993 | Toennies | Nov. 26, 1940 |
| 2,463,877 | Hoglan | Mar. 8, 1949 |
| 2,525,902 | Hoglan et al. | Oct. 17, 1950 |